Dec. 29, 1970 R. H. KIESSLING ETAL Re. 27,016

ELECTRIC LIMIT SWITCH HAVING A DIAGONALLY DIVIDED HOUSING, A DETACHABLE ACTUATOR, AND MECHANISMS FOR CAUSING SELECTED OPERATION OF A PUSHBUTTON SNAP SWITCH

Original Filed June 5, 1964 3 Sheets-Sheet 1

INVENTOR.
RUDOLF H. KIESSLING
CARL A. SCHAEFER

BY William H. Schmeling

ELECTRIC LIMIT SWITCH HAVING A DIAGONALLY DIVIDED HOUSING, A DETACHABLE ACTUATOR, AND MECHANISMS FOR CAUSING SELECTED OPERATION OF A PUSHBUTTON SNAP SWITCH

Original Filed June 5, 1964 3 Sheets-Sheet 2

INVENTORS
RUDOLF H. KIESSLING
CARL A. SCHAEFER
BY William H. Schmeling

ELECTRIC LIMIT SWITCH HAVING A DIAGONALLY DIVIDED HOUSING, A DETACHABLE ACTUATOR, AND MECHANISMS FOR CAUSING SELECTED OPERATION OF A PUSHBUTTON SNAP SWITCH

Original Filed June 5, 1964 3 Sheets-Sheet 3

INVENTORS
RUDOLF H. KIESSLING
CARL A. SCHAEFER
BY William H. Schmeling

United States Patent Office

Re. 27,016
Reissued Dec. 29, 1970

27,016

ELECTRIC LIMIT SWITCH HAVING A DIAGONALLY DIVIDED HOUSING, A DETACHABLE ACTUATOR, AND MECHANISMS FOR CAUSING SELECTED OPERATION OF A PUSHBUTTON SNAP SWITCH

Rudolf H. Kiessling, Glendale, Wis., and Carl A. Schaefer, Asheville, N.C., assignors to Square D Company, Park Ridge, Ill., a corporation of Michigan Original No. 3,275,764, dated Sept. 27, 1966, Ser. No. 372,854, June 5, 1964. Application for reissue Oct. 17, 1969, Ser. No. 870,464

Int. Cl. H01h *15/14*

U.S. Cl. 200—47 18 Claims

Matter enclosed in heavy brackets [ ] appears in the original patent but forms no part of this reissue specification; matter printed in italics indicates the additions made by reissue.

*ABSTRACT OF THE DISCLOSURE*

*A turret head type electric limit switch which may be of the plug-in or non plug-in type. The switch is provided with a housing that has side walls divided diagonally so that the switch will be oil tight and easy to wire and service. The housing is arranged so that different type turret head operators may be secured thereon and maintaining against movement from any one of a plurality of positions by cooperating bosses and recesses that are formed on the housing for the limit switch and the housing for the turret head operator. The operative connection between the turret head operator is provided by programmable plungers and sliders which are arranged to actuate the snap switch within the housing in response to the actuation of the turret head operator.*

The present invention relates to electric switches and more particularly, to an electric limit switch type device which includes a novel enclosure and operating mechnisms which are arranged so the switch may be readily wired, serviced and assembled to provide a large variety of different combinations of switching operations using a minimum of interchangeable parts.

It is an object of the present invention to provide an improved compact, simple, rugged snap action type limit switch which can be readily installed and serviced and converted to provide a large variety of different switching operations so it can be used in a large number of different kinds of installations and positions.

Another object of the present invention is to divide an enclosure for the basic switching mechanism for a limit switch into two separable parts in a manner so the part which is mounted on a support for the limit switch includes an opening for passing electrical conductors to the interior of the enclosure and the other part, which is detachably secured to the mounted part, has an end wall located remote from the opening on which a switch operator may be mounted in a variety of angular positions.

A further object of the present invention is to divide the sidewalls of a rectangular housing for an electric limit switch along a diagonal line to provide a pair of separable mating parts which are arranged to define a closed internal cavity when the parts are secured together and to arrange the division of the side walls so the part which is secured to a support for the switch has an opening at one end for electrical conductors and the part which is secured to the mounted part has provisions for mounting a movable external operator thereon in a plurality of angular positions on an end of the secured part which is remote from the opening in the mounted part and to mount a switch unit on the secured part and a terminal block on the mounted part so the switch unit and terminal block are within the cavity when the parts are secured together and to provide a plug-in type electrical connection between the switch unit and terminal block so the part on which the switch unit is mounted may be readily installed and removed without disturbing the connections between the terminal block and electrical conductors passing through the opening in the mounted part.

In carrying out the foregoing object it is another object of the present invention to provide the end of the housing part on which the external operating mechanism is mounted with a square shaped portion and raised bosses at each of the corners of the square shaped portion, which bosses are arranged to be received in cooperatively shaped recesses in a housing for the operating mechanism to provide a rugged non-rotatable connection between the two housing parts when the housing parts are in any one of a plurality of angular positions relative to each other.

It is a further object of the present invention to provide an actuating arrangement for a snap switch in an electric limit switch wherein an operator of the snap switch is actuated by a slider which in turn is actuated by a pair of individually movable plungers which are moved in response to the direction of movement of an operator external to the housing for the limit switch which operator may be mounted in any one of a plurality of angular positions on a housing for the snap switch.

Another object of the present invention is to provide an electric limit switch with an arrangement for actuating a pair of snap switches mounted in tandem in an enclosure, said snap switches being actuated through a pair of sliders and a pair of plungers by an externally mounted operator which may be positioned in any one of a plurality of angular positions on the enclosure for the snap switches and to arrange the sliders and the plungers in various combinations so the snap switches may be selectively made to operate simultaneously, alternately, sequentially, or alternately and simultaneously in response to the direction of movement of the external operator.

In carrying out the foregoing objects it is another object to provide at least one of the sliders with an adjustment means for varying the response of the snap switch operated thereby to the movement of the external operator.

A still further object of the present invention is to provide an electric limit switch with an enclosure which provides an internal cavity wherein at least one snap switch is mounted to have an operator facing one end of the enclosure and to provide an actuator in any one of five openings in the end of the enclosure which, through a movable slider, will actuate the operator of the snap switch in response to movement of an operator which may be mounted in any one of a plurality of angular positions on the end.

Another object of the present invention is to provide an operator for an electric limit switch which may be mounted in any one of a plurality of angular positions on an end of an enclosure for the snap switches of the limit switch and to provide the operator with a housing having a cavity facing the end, a shaft having a portion within the cavity and a portion extending external to the housing, a pair of members which are biased by a spring in opposite directions and carried on the shaft and to arrange the members on the shaft so that when the shaft is rotated in one direction, one of the members will move one of a pair of plungers and when the shaft is rotated in the opposite direction, the other of said members will impart movement to the other of the plungers.

Further objects and features of the invention will be readily apparent to those skilled in the art from the specification and appended drawings illustrating certain preferred embodiments in which.

Figure 2:
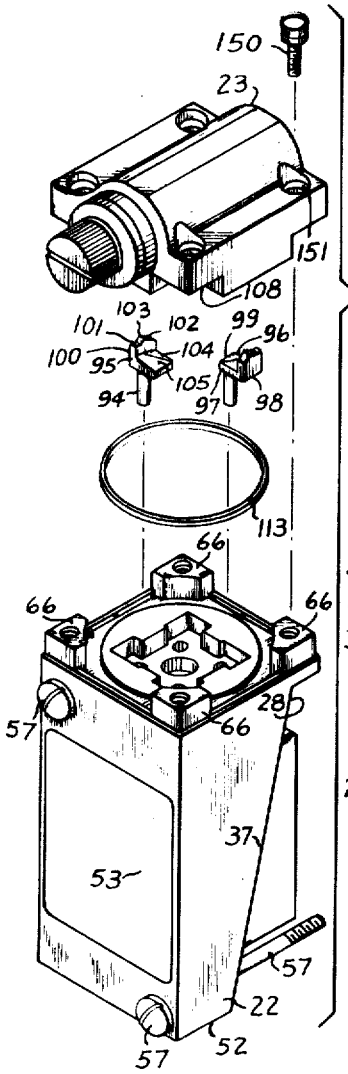
FIG. 2 is an exploded view showing in perspective the switch operating components of the limit switch in FIG. 1.
Figure 3:
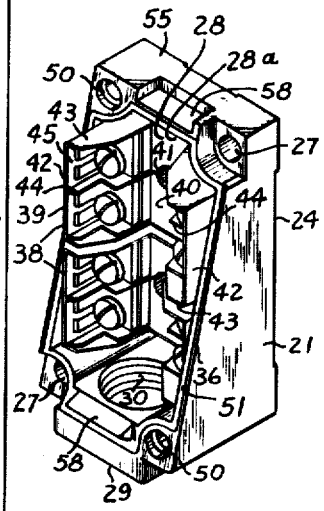
FIG. 3 is a perspective view of a base section of the limit switch in FIG. 1.
Figure 1:
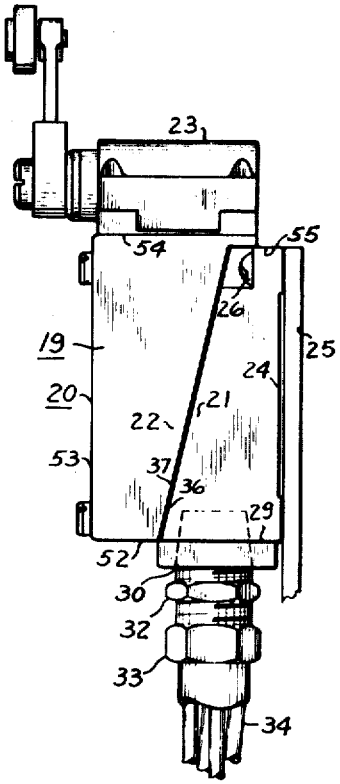
FIG. 1 is a side elevational view of a limit switch incorporating features of the present invention.

Referring to FIGS. 1–3 of the drawings, an electric limit switch 19 is shown as having a rectangular housing or enclosure 20 which is formed of two mating enclosure parts 21 and 22 and an external operator mechanism 23. The enclosure part 21 which acts as a base, has a rear wall 24 which is arranged to secure the switch 19 to a support 25. The part 21 is secured to the support 25 by a pair of screws 26 which pass through bores 27 located at opposite diagonal corners of the part 21, as shown in FIG. 3. Preferably the corners of the part 21 wherein the bores 27 are located are recessed to provide clearance for the heads of the screws 26 when the part 22 is secured to the part 21 to provide the enclosure 20. The enclosure 20 has an internal closed cavity 28 which is formed when the parts 21 and 22 are secured together. The part 21 has a bottom wall 29 wherein a threaded opening 30 is formed to extend from the exterior of the part 21 to the portion 28a of the cavity 28 within part 21. The threaded opening 30, as shown in FIG. 1, is provided to secure a conventional threaded coupling 32 which secures an electrical conduit 33 through which electrical conductors 34 are passed from the exterior of the enclosure 20 into the cavity 28. The enclosure 20 has a pair of parallel side walls which are preferably divided diagonally to provide complementary diagonally disposed edges 36 and 37 on the parts 21 and 22.

Positioned within the cavity 28a are a pair of identical terminal connectors and female type portions of plug-in connector assemblies 38. As the connector assemblies 38 are identical, only one will be described. Each connector assembly 38 includes a part 39 which is formed of a molded insulating material to have a bottom wall 40 which is secured to the part 21 by peening a rivet-like portion which extends from the bottom wall of the part 21 and is received in an opening 41 in the bottom wall 40.

The part 39 has a pair of spaced side walls 42 and end walls 43. Equidistant between the end walls 43 and extending between the side walls 42 and the bottom wall 40 are partitions 44 which effectively provide the part 39 with four alcoves 45. Each of the alcoves 45 has a threaded insert, not shown, molded in the bottom wall 40 which secures a base portion of a resilient metal part which has a bifurcated arm 47 which acts as a female connector spaced from and extending parallel to the side wall 42. The threaded insert is arranged to receive a screw 48 which is used to tighten a wire clamp 49 on a bared end of an electrical conductor 34 passing through the opening 30 for the purpose of electrically connecting the conductor 34 to the resilient bifurcated arm 47.

The part 21 is provided with threaded bores 50 at the opposite diagonal corners as shown in FIG. 3, and if desired, the entire edge of the part 21 surrounding the cavity 28a may be grooved to provide a seat for a gasket 51 to provide a seal between the parts 21 and 22 when their mating surfaces are secured together.

The part 22 which carries the switching units for the device, has a bottom wall 52 which forms a continuation of the bottom wall 29 and a front wall 53 parallel to the rear wall 24 when the parts 21 and 22 are secured together, as in FIG. 1. The part 22 also has an end or top wall 54 remote from the bottom wall 52 which is square shaped and has a portion slightly overhanging a top wall 55 of the part 21. The part 22 is provided with suitable bores 56 which extend from the front wall 53 and are aligned with threaded openings 50 to provide passages for screws 57 which are threaded into the openings 50 to thereby secure the part 22 to the part 21. If desired, the parts 21 and 22 may be provided with suitable keying bosses 58 for further positioning the parts in their mating relationship.

Figure 4A:
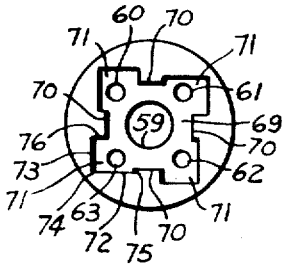
FIG. 4A is a view of a portion of the top end in FIG. 4 to clearly identify the parts of the recess on the top end.
Figure 4:
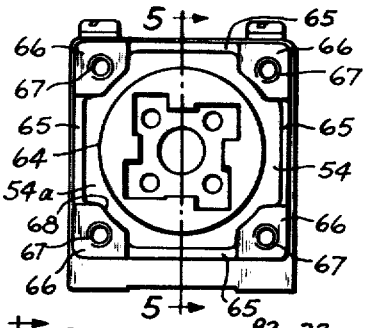
FIG. 4 is a plan view of the top end of the limit switch in FIG. 1 with the operator portion removed.

As shown in FIGS. 4 and 4A, the top wall 54, which is square shaped, is provided with a central opening 59 and four quadrately located openings 60, 61, 62 and 63, all of which extend into the cavity 28. The openings 60–63 are located equidistantly from the center of the opening 59 at the corners of an imaginary square which has its diagonals passing through the center of the opening 59.

Centrally located on the top wall 54 is a raised circular boss 64 which is centered at the center of the opening 59 and has a diameter sufficient to expose a flat surface 54a of the top wall 54 between the periphery of the boss 64 and raised ribs 65 which extend upwardly from the four side edges of the top wall 54.

Extending upwardly from each of the four corners of the top wall 54 and projecting beyond the top surface of the ribs 65 is a raised boss-like portion 66. Each of the bosses 66 are identical and are generally square shaped, having a threaded bore 67 downwardly extending from the center of its top surface. Each of the bosses 66 are provided with an arcuate side wall 68 having a curvature defined by an arc centered in the center of the opening 59 to expose the surface 54a of the top wall 54 between each of the bosses 66 and the periphery of the circular boss 64.

Extending downwardly from the top surface of the circular boss 64 is an irregularly shaped recess 69 which is generally square in shape. For purposes of description, as shown in FIG. 4A, the recess 69 will be said to have vertical wall portions 70 which constitute the remaining portions of an imaginary square recess which has its diagonals intersecting at the center of the opening 59 and its sides tangent to the portions of the openings 60–63 remote from the center of the opening 59. For further purpose of description, the recess *69* may be described as having a rectangular recess 71 at each of its four corners. As each of the recesses 71 are identical and face in opposition directions at the opposite diagonal corners of the recess 69, only the recess 71 in the lower left corner of FIG. 4A will be supplied with identification numerals. The recess 71 has walls 72 and 73 which intersect at right angles to provide corners 74. Each of the corners 74 of all of the recesses 71 are equidistantly spaced from the periphery of the boss 64. The recesses also have portions of walls 75 and 76 which are arranged so the center of an imaginary diagonal of the recess 71 does not coincide with the center of the openings 61–63. To accomplish the foregoing, the walls 72 and 76 are equidistantly spaced on opposite sides of the horizontal axis through the opening 63 while the walls 73 and 75 are arranged so the wall 73 is at a greater distance from the vertical axis through the opening 63 than wall 75.

Positioned within the cavity 28b in the part 22 are a pair of snap acting electric switches 77 and 77a. The switches 77 and 77a, which per se do not constitute a feature of the present invention, are preferably identical and each have a bottom wall supported by the bottom wall of the cavity 28b in the part 22 and are provided with extending lugs which are aligned with bosses extending upwardly from the bottom wall of cavity 28b to provide an arrangement whereby the switches 77 and 77a may be secured by screws 78 in the cavity. The switches 77 and 77a have actuators 79 and 80 which face the top wall 54. The actuators 79 and 80, as is conventional with the type of switch herein used, are each preferably biased toward the top wall 54 by suitable means within the switch casing and are arranged to move internal switching contacts in response to movement of the actuators 79 and 80 for making and breaking currents between male plug-in terminals 79a and 80a carried on the respective switches 77 and 77a.

Movably positioned within the cavity are a pair of sliders. As different forms of different sliders may be used to accomplish different combinations of switch results for the switch 20, each of the forms will be hereinafter described.

Figure 5:
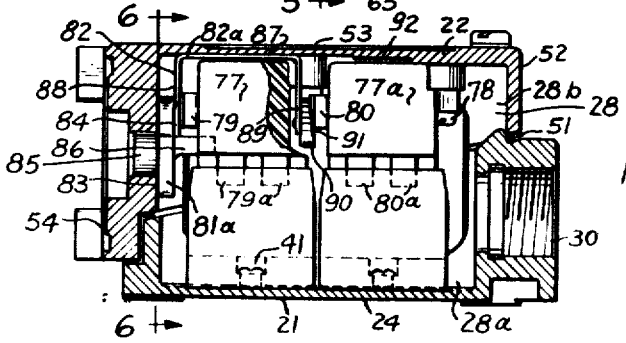
FIG. 5 is a cross sectional view taken along lines 5—5 in FIG. 4 of one form of the limit switch according to the present invention.
Figure 6:
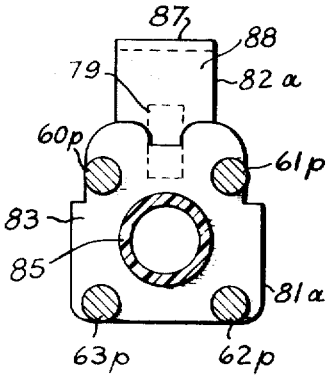
FIG. 6 is a plan view particularly showing a slider arrangement incorporated on the switch shown in FIG. 5.
Figure 8:
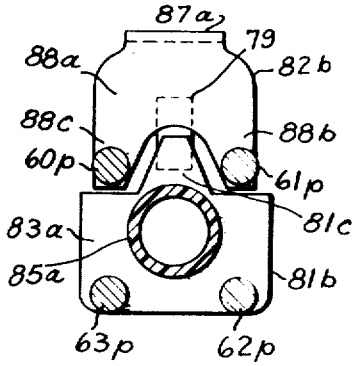
FIG. 8 is a plan view particularly showing the slider arrangement incorporated in the limit switch in FIG. 7.
Figure 7:
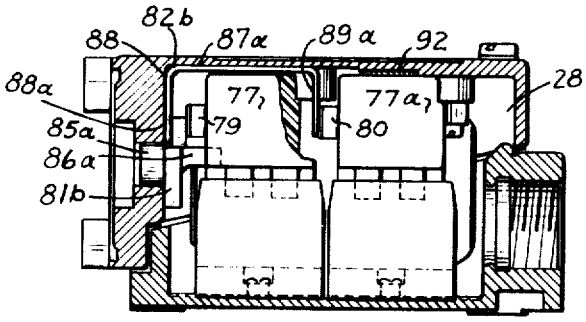
FIG. 7 is a cross sectional view taken along line 5—5 in FIG. 4 showing a modification of the switch shown in FIG. 5.

The embodiment shown in FIG. 5 employs sliders 81a and 82a shown in FIG. 6, and the embodiment shown in FIG. 7 uses sliders 81b and 82b, shown in FIG. 8, to cause operation of the switches 77 and 77a. However, before the description of the sliders is undertaken it should be understood that the openings 60–63 each are arranged to receive a shank of a headed plunger which will be designated by a numeral 60–62 and a suffix "p" indicates the particular opening 60–63 wherein the plunger is installed. The designation 60p indicates the plunger in the opening 60, 61p indicates the plunger in the opening 61, etc.

The slider 81a in FIGS. 5 and 6 has a front face 83 and a rear face 84. Extending forwardly of the front face 83 is a circular boss 85 which is received in the opening 59 to guide the slider 81a in a reciprocal path of movement. Extending from the rear face 84 is a rectangular projection 86 which is received in a suitably located notch in the top external wall of switch 77 to further guide the slider 81a in its reciprocal path of movement. In FIGS. 5 and 6, the slider 81a and is positioned between portions of the slider 82a and the actuator 79 of the snap switch 77 and the ends of plungers 60p–63p. Thus when any of the plungers 60p–63p are moved toward the cavity 28b, the slider 81a as in FIG. 5, will be moved from left to right and cause the actuator 79 and the slider 82a to move to the right. The slider 82a has a portion 87 passing below the bottom wall of the switch 77 which is guided in a suitable slot in a portion of the front wall 53 facing the cavity 28b. Extending from opposite ends of the portion 87 are portions 88 and 89. The portion 88 is arranged to be engaged by the slider 81a and the portion 89 extends to a position aligned with the actuator 80 of switch 77a. The spring biased actuators 79 and 80 normally urged the sliders 81a and 82a toward the left in FIG. 5. Thus when the plungers 60p–63p cause the slider 81a to move to the right, the actuators 79 and 80 will be simultaneously moved to the right to simultaneously actuate both of the switches 77 and 77a. In connection with the embodiment shown in FIG. 5, it is well known that variations in manufacturing tolerances and the characteristics of snap switches may prevent the switches 77 and 77a from being simultaneously actuated in response to the movement of the plungers 60p–63p. Alternately, under other conditions, it may be desirable to have the switches 77 and 77a operate sequentially in response to the movement of the plungers 60p–63p. To accomplish the foregoing the portion 89 is provided with an adjustment means which includes a cam 90 which is rotatable on the portion 89. The cam 90 is generally cylindrical and has a central opening located to pass a rivet for securing a flat rear face to the portion 89 in a position so only a portion of a front face 91 of the cam 90 engages the actuator 80. The front face 91 is shaped to provide a circular inclined ramp which faces actuator and is arranged so only a portion engages the actuator 80. The rivet which secures the cam 90 to the portion 89 is arranged to normally maintain the cam 90 against rotation on the portion 89 but to permit the cam to be manually rotated. Thus as the cam is rotated the area of engagement between the inclined ramp on the front face 91 and the actuator 80 may be varied to change the effective operating length of the slider 82a so the switches 77 and 77a can be made to operate either simultaneously or sequentially in response to movements of the plungers 60p–63p.

In the embodiment shown in FIGS. 7 and 8 sliders 81b and 82b are provided. The slider 81b has an extending circular boss 85a extending from a front face 83a and a projection 86a. The boss 85a and the projection 86a are identical to the boss 85 and the projection 86 and are respectively received in the opening 64 and a notch in the switch 77 for the purpose of guiding the slider 81b in like manner as the boss 85 and the projection 86 guided the slider 81a in the embodiment shown in FIGS. 5 and 6. In the embodiment shown in FIG. 7 the front face 83a of the slider 81b is shaped so only the plungers 62p and 63p can impart movement to the slider 81b. Similarly, the slider 82b has a portion 88a shaped to provide portions 88b and 88c which are engaged by the plungers 61p and 60p. The slider 81b is provided with a portion 81c which is in engagement with the actuator 79 of the switch 77 and is arranged to pass between the portions 88b and 88c so the sliders 81b and 82b do not engage one another in their reciprocal paths of movement.

As shown in FIG. 7, the sliders 81b and 82b are positioned in the cavity 28b so the front face 83a and the portion 88a of the sliders 81b and 82b are adjacent the top wall 54. The slider [81b] *82b* has a portion 87a similar to the portion 87 on the slider 82a and a portion 89a similar to the portion 89 on the slider 82a.

In the embodiment shown in FIG. 7, an adjustment cam similar to the cam 90 on the portion 89 has not been included on the portion 89a although it could be included, if desired. In the embodiment shown in FIG. 7 the portion 89a directly engages the actuator 80 of the switch 77a.

In the embodiment shown in FIG. 7 it will be seen that when either of the plungers 62p or 63p is moved, the slider 81b will move the actuator 79 so that only the switch 77 will be actuated while the slider 82b remains undisturbed and the switch 77a is not actuated. Similarly, when either plunger 60p or 61p is actuated, slider 82b will move while the slider 81b remains undisturbed. It will be seen in FIG. 7 that when the slider 82b moves to the right, as caused by the actuating movement of the plungers 60p or 61p, the portion 89a will move the actuator 80 and actuate the switch 77a before the [portions] *portion* [88] *88a* of the slider 82a is moved sufficiently to engage and move the actuator 79 a distance sufficient to actuate the switch 77. The degree of movement of the plungers 60p and 61p is limited to an extent that upon movement of the plungers 60p or 61p, the movement of the slider 82b is insufficient to move the actuator 79 to actuate the switch 77. Thus when either of the plungers 62p or 63p are moved, the switch 77 will be actuated while the switch 77a is not actuated, and when either of the plungers 60p or 61p are moved, the switch 77a is actuated while the switch 77 remains unactuated. The sliders 81b and 82b thus provide an arrangement for operating the switches 77 and 77a alternately.

A further possible modification of the device 20 is to utilize the slider 82b in combination with the slider 81a and to position the sliders in the cavity 28b so the portion 88a of the slider 82b is in engagement with the top wall 54, as in FIG. 6, and the slider 81a is positioned between the portion 88a and the switch 77. When the sliders 82b and 81a are thus positioned it will be apparent that the movement of the plungers 62p or 63p will impart movement only to the slider 81a so that only the switch 77 is actuated. However, when either of the plungers 60p or 61p are moved, the portions 88b and 88c of the slider 82b will engage the front face 83 of the slider 81a so the sliders 82b and 81b are both simultaneously moved to cause simultaneous operation of the switches 77 and 77a.

If desired, a suitable insulating liner 92 formed of a flexible material may be included in the cavity 28a to overcome electrical clearance problems which may occur when the parts 21 and 22 are assembled. The liner 92 has portions 93 which are received between the side walls of the cavity 28a and the molded terminal block assemblies 38 and the switches 77 and 77a so the terminals 79a and 80a and the bifurcated arms 47 will be separated from the walls of the cavity 28 with a sufficient electrical clearance.

As was previously set forth, a plunger 60p–63p is receivable in any of the openings 60–63. Each of the plungers have a shank portion 94 and a head portion 95. The shank portion 94 is received in the openings 60–63 which act as guides for reciprocal movement of the plungers 60p–63p. The head portions 95 of the respective plungers are received in the recesses 71 which are arranged so the plungers 60p–63p are oriented in a predetermined manner and are movable in the recesses 71. This is accomplished by locating the head portion 95 on the shank portion 94 so the side walls 96 and 97 on the head portion will be juxtaposed to the walls 72 and 76 of the recess 71 and the end walls 98 and 99 will be respectively juxtaposed to the end walls 73 and 75. Each of the head portions have an upper or top surface which is shaped to provide an upstanding wall 100 which has an inclined camming surface 101 and an inclined clearance surface 102 which are joined at an apex 103. The shape of the camming surface 101, the clearance surface 102 and the position of the apex 103 may be slightly varied to change the responsive operation of the plungers 60p–63p to an external operator which will be later described. The surfaces 101 and 102 and the apex 103 are arranged on the wall 100 so the camming surface extends from the wall 72 toward the wall 76 and the clearance surface extends from the apex 103 toward the wall 76 in each of the recesses 71. Additionally, the top surface of each head portion 95 is provided with portions 104 and 105 provided as inclined surfaces which extend downwardly from the wall 100 to provide clearance for an operator when the plungers are in an inactive position as will be hereinafter described.

Figure 11:
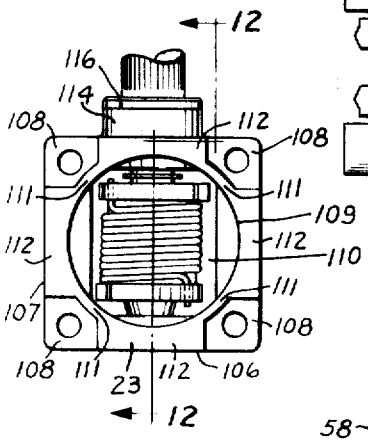
FIG. 11 is a plan view of a bottom surface of an operator as used with the limit switch in FIG. 1.
Figure 9:
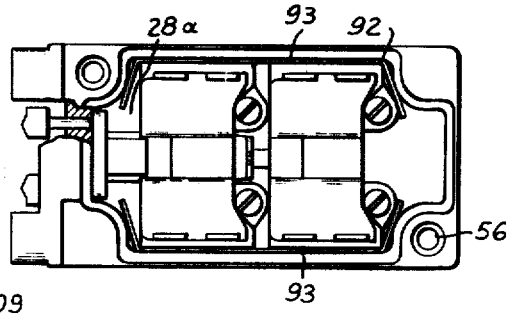
FIG. 9 is a plan view of the switch section of the limit switch in FIG. 1 including a broken-away portion to illustrate certain details of a plunger for the switch.
Figure 10:
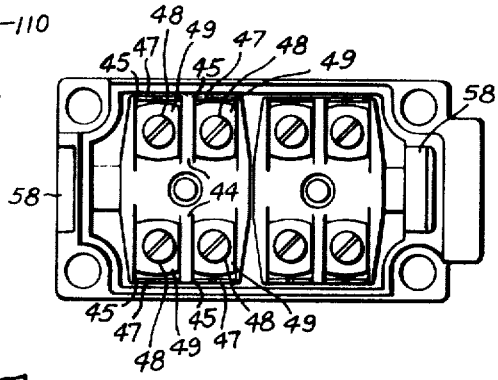
FIG. 10 is a plan view of the base section of the limit switch in FIG. 1.
Figure 12:
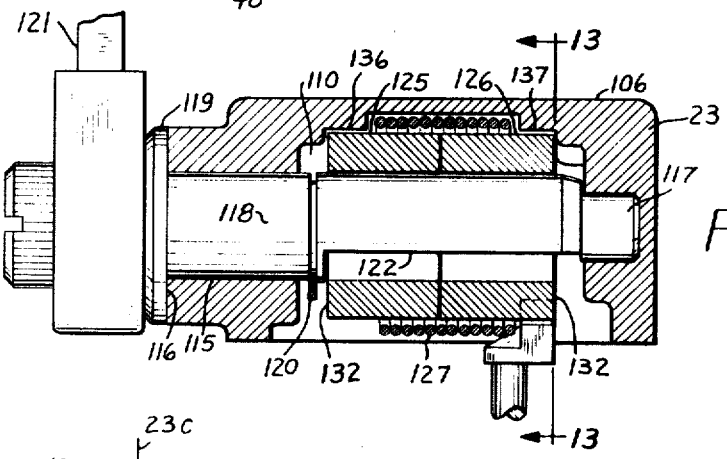
FIG. 12 is a cross sectional view taken along line 12—12 in FIG. 11 in the direction of the indicating arrows.
Figure 13:
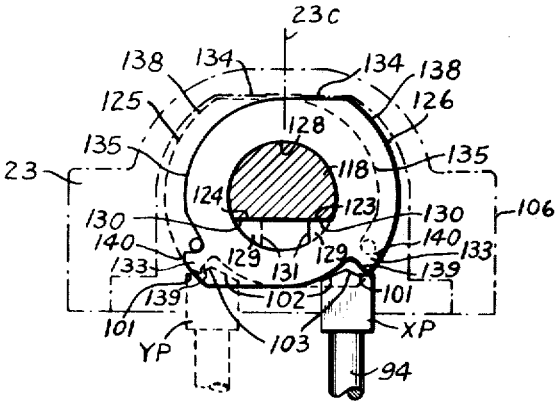
FIG. 13 is a view taken in the direction of the indicating arrows 13—13 in FIG. 12 showing in elevation details of the operating mechanism.

While the enclosure 20 will accept a variety of forms of external operator mechanisms 23, one form is shown in detail in FIGS. 11–13. In the preferred form, each external operator mechanism is provided with an external housing 106 which has a square shaped bottom surface 107 complementary in shape and size to the top surface 54 of housing part 22. The complementary shape of the surface 107 is accomplished by providing a recess 108 in each of the corners of the surface 107 which are complementary in size and shape with the bosses 66.

Further the bottom surface is provided with a central circular opening 109. The opening 109 is centered in the square shaped bottom surface 107 and extends into an internal cavity 110 within the housing 106. The opening 109 has a diameter slightly larger than the diameter of the circular boss 64 and thus together with the recesses 108 effectively provides a raised rib 111 adjacent each of corners and a raised boss 112 between the adjacent recesses 108. The ribs 111 and the bosses 112 are arranged to compress a sealing gasket 113 into sealing engagement with the surfaces 54a of the top surface 54 of part 22 when the operator mechanism 23 is secured to the top surface 54.

The housing 106 has an externally projecting hub 114 projecting from one side. The hub 114 has a bore 115 extending from a flat end 116 of the hub 114 into the cavity 110. The bore 115 is axially aligned with a bore 117 which extends from the cavity 110 partly into the side wall of the housing 106 opposite to the wall wherein the bore 115 is formed. The bores 115 and 117 provide bearing supports for a shaft 118 which has one end journalled in the bore 117 and its other end extending through the bore 115 external of the housing 106. If desired, the shaft 118 may be provided with a flange 119 which engages the end wall 116 and a groove to receive a snap ring 120 which flange 119 and ring 120 serve to maintain the shaft 118 and the housing 106 assembled. Further if desired, the external end of the shaft 118 may be knurled to provide a means for nonrotatably securing an external operator such as an arm 121.

The portion of the shaft 118 within the cavity 110 is cut away to provide a flat surface 122 having edges 123 and 124. Rotatably carried on the portion of the shaft 118 within the cavity 110 are two identical cam members 125 and 126 which face in opposite directions and are interconnected by a torsion spring 127. The members 125 and 126 each have a bore 128 to provide a bearing support for the members 125 and 126 on shaft 118. For identification purposes, in FIG. 13 the parts of the member 126 are shown in full lines and the portions of the member 125 in broken lines. Extending inwardly in each bore 128 is a rib-like lug 129 which has surfaces 130 and 131 at right angles to each other. The lugs 129 and the flattened surface 122 are arranged so the surfaces 130 and 131 will engage the edges 123 and 124 to limit rotation of the members to 90° on the shaft 118. Extending outwardly from an end 132 of the members 125 and 126 is a lug 133 which provides a seat for an end of the torsion spring 127. The torsion spring 127 has its intermediate portion surrounding the body portion of the members 125 and 126 and its opposite ends in engagement with the lugs 133 and is arranged to constantly urge the members 125 and 126 in opposite directions of rotation on the shaft 118 to a position wherein the surface 130 on the member 126 engages the edge 123 and the surface 130 on the member 125 engages the edge 124. Extending outwardly from the ends 132 on the members 125 and 126 are stop surfaces 134. The surfaces 134 on the respective members 125 and 126 are preferably parallel to the surfaces 130 on the respective members 125 and 126 and extend tangentially outwardly of the cylindrical surface portion 135 in a direction as shown in FIG. 13 with the ribs for the surfaces 130 on the members 125 and 126 located on the same side of a center line 23c as the stop surfaces 134. Projecting from the bottom wall of the cavity 110 at opposite ends of the cavity 110 are stops 136 and 137. The stops 136 and 137 on the housing 106 and the stop surfaces on the members 125 and 126 are arranged so that the stop surface 134 on the member 125 is in engagement with the stop 136 and the stop surface 134 on the member 126 is in engagement with the stop 137 when the shaft 118 and the members 125 and 126 are positioned as shown in FIG. 13.

The stop surfaces 134 extend outwardly of the center line 23c and terminate at a [junction] *juncture* with a cam surface 138 formed by a portion of a cylindrical surface having a radius centered at the center of the bores 128. The cam surfaces 138 terminate at a cam edge 139 located approximately along a radius passing from the center of the bore 128 through the apex of the rib-like lug 129. In this connection it should be noted that the leading edge 140 of the lugs 133 are located at a radial angle slightly greater than 90° from the cam edge 139.

The operation of the parts of the external operator mechanism 23 will now be set forth, reference being had to FIG. 13 of the drawing. When the parts of the mechanism are at rest, the torsion spring 127 urges the cam member 126, shown in full lines in FIG. 13, in a counterclockwise direction to a position wherein the stop surface 134 on the member [125] *126* engages the stop 137 and the cam member 125, shown in broken lines, clockwise to a position wherein the stop surface 134 on the member [126] *125* engages the stop 136. When the members 125 and 126 are thus positioned, the surfaces 130 on the members 126 and 125 will respectively engage the edges 123 and 124 thereby maintaining the shaft 118 in its centered position.

Also in FIG. 13 the plungers 60p–63p which are actuated by the cam members 125 and 126 in response to the direction of rotation of shaft 118 are shown. The plungers will be designated as XP and YP with the XP plunger shown in full lines as positioned for actuation by the cam member 126 and the plunger YP shown in broken lines as positioned for actuation by the cam member 125. The plungers XP and YP each have their respective inclined cam surfaces 101, inclined clearance surfaces 102, apexes 103 and shank portion 94 designated as previously described.

When an external force is applied to cause rotation of shaft 118 in a clockwise direction in FIG. 13, the edge 123 on the shaft 118 will press against the surface 130 on the member 126 and thereby cause the member 126 to rotate in a clockwise direction. As the member 126 initially rotates clockwise, the camming edge 139 on the member 126 will slide on the inclined cam surface 101 on the plunger XP to thereby cause the plunger XP to move downwardly. After the member 126 has rotated clockwise a few degrees of rotation, the apex 103 on the plunger XP passes into engagement with the cylindrical cam surface 138 on the member 126 and the downward movement of the plunger XP ceases and the inclined clearance surface 102 on the plunger XP engages the surface 138 on the member 126. The shaft 118 is prevented from rotating further than 90° in a clockwise direction from its initial position by a pair of stop means. One of the stop means is provided by the lug 133 on the member 126 which is located to engage the stop 137 at 90° of rotation of the member 126. The other stop means is provided when the edge 123 on the shaft 118 moves into engagement with the surface 131 on the member 125, as will now be explained. It will be seen that as the shaft 118 rotates clockwise, the edge 124 of the shaft 118 will move from its engagement with the surface 130 on the member 125 so that while the shaft 118 is rotated clockwise, the member 125 will not be caused to rotate and the stop surface 134 on the member 125 will remain in engagement with the stop 136 because of the force exerted by the torsion spring 127. However, when the shaft 118 is rotated 90° clockwise from its initial position, the edge 123 on the shaft 118 will be rotated to engage the surface 131 on the member 125 which is held against clockwise rotation by the engagement of its stop surface 134 with the stop 136. Thus the member 125 will prevent clockwise rotation of the shaft beyond 90° from the initial at-rest position of the parts of the operation mechanism 23.

When the force causing a clockwise rotation of the shaft 118 is released, the shaft 118 and the member 126 will be returned to the neutral or initial position by the torsion spring 127. This result is accomplished because the member 125 was prevented from rotating clockwise and the torsion spring 127 was tightened during the clockwise rotation of the member 126. Thus as the end of the torsion spring 127 which is attached to the member 125 was relatively fixed during the clockwise rotation of the member 126, release of the force causing a clockwise rotation of the member 126 will permit the torsion spring 127 to rotate the member 126 in a counterclockwise direction to the neutral position wherein the stop 134 on the member 126 engages the stop 137 on the housing 106.

When an external force is applied to cause rotation of the shaft 118 in a counterclockwise direction in FIG. 13, the edge 124 on the shaft 118 will press against the surface 130 on the member 125 and thereby cause the member 125 to rotate in a counterclockwise direction. As the member 125 initially rotates counterclockwise, the camming edge 139 on the member 125 will slide on the inclined cam surface 101 on the plunger YP to thereby cause the plunger YP to move downwardly. After the member 125 has rotated counterclockwise a few degrees, the apex 103 on the plunger YP passes into engagement with the cylindrical cam surface 138 of the member 125 and the downward movement of the plunger XP ceases and the inclined clearance surface 102 on the plunger YP engages the surface 138 on the member 125. The shaft 118 is prevented from rotating further than 90° in a counterclockwise direction from its initial position by a pair of stop means. One of the stop means is provided by the lug 133 on the member 125 which is located to engage the stop 136 at 90° of rotation of the member 125. The other stop means is provided when the edge 124 on the shaft 118 moves into engagement with the surface 131 on the member 126 as will now be explained. It will be seen that as the shaft 118 rotates counterclockwise, the edge 123 of the shaft 118 will move from its engagement with the surface 130 on the member 126 so that while the shaft 118 is rotated counterclockwise, the member 126 will not be caused to rotate and the stop surface 134 on the member 126 will remain in engagement with the stop 137 because of the force exerted by the torsion spring 127. However, when the shaft 118 is rotated 90° counterclockwise from its initial position, the edge 124 on the shaft 118 will be rotated to engage the surface 131 on the member 126 which is held against counterclockwise rotation by the engagement of its stop surface 134 with the stop 137. Thus the member 126 will prevent counterclockwise rotation of the shaft beyond 90° from the initial at-rest position of the parts of the operation mechanism 23.

When the force causing a counterclockwise rotation of the shaft 118 is released, the shaft 118 and the member 125 will be returned to the neutral or initial position by the torsion spring 127. This result is accomplished because the member 126 was prevented from rotating counterclockwise and the torsion spring 127 was tightened during the counterclockwise rotation of the member 125. Thus as the end of the torsion spring 127 which is attached to the member 126 was relatively fixed during the counterclockwise rotation of the member 125, release of the force causing the counterclockwise rotation of the member 125 will permit the torsion spring 127 to rotate the member 125 in a clockwise direction to the neutral position wherein the stop 134 on the member 125 engages the stop 136 on the housing 106.

It is believed the assembly of the plug-in connector assemblies 38 within the cavity 28a in the part 21 as well as the positioning of the gasket 51 on the part 21 is apparent from the foregoing description. When the limit switch is placed in service generally the part 21 is secured to the support 25 by the fastening screws 26 and the electrical conduit 33 is secured in the opening 30 on the coupling 32. The conductors 34 are usually passed through the conduit 33 into the cavity 28a so their bared ends may be secured by the clamps 49 when the screws 48 are tightened to electrically connect the circuits wherein the conductors 34 are included to the resilient bifurcated metal arms 47 which act as female portions of a plug-in connector pair. It will be seen that the diagonal division of the side walls of the part 21 provides an arrangement which improves the accessibility to the screws 48 when connections to the conductors 34 are made.

An assembly including the part 22, the switches 77 and 77*a*, the insulating liner 92 and a pair of sliders selected from the sliders 81*a*, 81*b*, 82*a* and 82*b* are positioned within the cavity 28*b* of the part 22 as previously described to form the switching mechanism for the limit switch 19. The part 22 is then positioned on the part 21 with the diagonal edges 36 and 37 in mating relation. When the part 22 is positioned on the part 21, portions of the liner 92 act as a guide during the assembly of the part 22 on the part 21 as portions of the liner 92 are passed between the outer side wall portions of the walls 42 of the molded parts 39 and the inner walls of the cavity 28a. Also when the part 22 is positioned on the part 21, the male plug-in terminals 79a and 80a of the switches 77 and 77a engage the portions of the bifurcated arm portions 47 facing the center of the cavity 28a to provide an electrical connection between the switches 77 and 77a and the conductors 34. The assembly of the part 22 on the part 21 is completed when the screws 57 are threaded into the threaded bores 50 on part 21.

Two or more of the plungers 60p–63p are installed in the openings 60–63 to provide different operations of the switching mechanism in the part 22 in response to movements of the operator mechanism 23 as will now be described.

As was previously explained, a force on the operator arm 121 will cause the shaft 118 of the external operator mechanism 23 to rotate in either a clockwise or counterclockwise direction to actuate either of the cam members 125 or 126 which in turn will actuate one of the plungers 60p–63p. The limit switch according to the present invention can be made to operate in response to a clockwise movement, a counterclockwise movement or respond to both clockwise and counterclockwise movements of the arm 121 by properly locating the plungers 60p–63p for the various rotative positions of the operator mechanism 23 on the top wall of the enclosure 20 as will be described in connection with FIGS. 14–17 wherein the operator mechanism is shown as respectively having the shaft 118 etxending from the front wall 53, the left sidewall, the rear wall and the right sidewall and wherein clockwise and counterclockwise refers to the operation obtained when viewing the end of the shaft 118. Further it will be seen that when the limit switch is to be responsive to rotation of the shaft in only one direction at least one plunger must be removed and when the limit switch is to be responsive to two directions of rotation of the shaft, all of the plungers 60p–63p may be included in all of the openings $\mathbf{60}_p$–$\mathbf{63}_p$, although only two of the plungers at the opposite corners of one diagonal will be active and the other two plungers at the opposite corners of the other diagonal will act as spares. This result is obtained because the camming edge 139 passes with clearance over the scrfaces 104 and 105 of the plungers which act as spares. It is believed the following tabulation will illus-
which are received in the recesses 108 without depending
tation of shaft 118, "CCW" refers to counterclockwise rotation and the FIGS. 14–17 are respectively designated to indicate the position of the operating mechanism 23 on housing 20.

Figure 17:
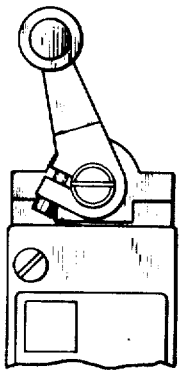
FIGS. 14–17 are front elevational views of the limit switch in FIG. 1 illustrating the various positions in which the operator for the limit switch may be mounted on the switch housing.
Figure 14:
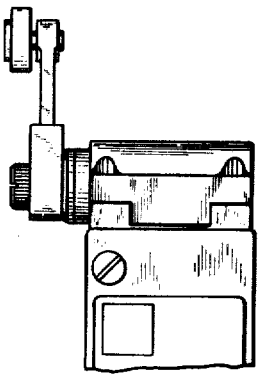
Figure 15:
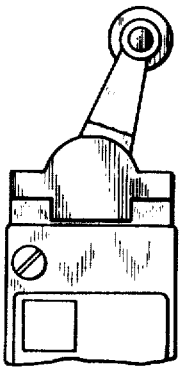
Figure 16:
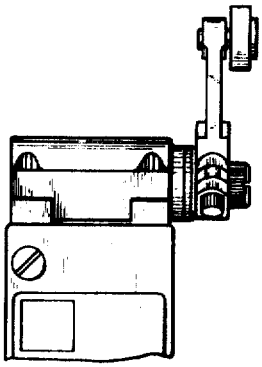

| | Operation | Plunger in Opening | |
|---|---|---|---|
| | | Active | Omitted |
| Fig. 14 | CW | 60 | 62 |
| | CCW | 62 | 60 |
| | CW and CCW | 60, 62 | |
| Fig. 15 | CW | 61 | 63 |
| | CCW | 63 | 61 |
| | CW and CCW | 61, 63 | |
| Fig. 16 | CW | 62 | 60 |
| | CCW | 60 | 62 |
| | CW and CCW | 60, 62 | |
| Fig. 17 | CW | 63 | 61 |
| | CCW | 61 | 63 |
| | CW and CCW | 61, 63 | |

The external operator mechanism 23 is securable to the top surface of housing 20 in any of the positions indicated in FIGS. 14–17 when screws 150 are passed through the openings 151 at the opposite corners of housing and are tightened in the threaded bores 67 of bosses 66. It is apparent that when the external operator mechanism 23 is in position on the housing 20, relative rotation of the housing 106 of the external operator mechanism 23 and the housing 20 is effectively prevented by the bosses 66 which are received in the recesses 108 without depending on the screws 150 to prevent rotation of the parts. Further, the gasket seal 113 is pressed into sealing engagement between the housing 106 and the housing 20 when the external operator mechanism 23 is applied to the housing 20 to prevent entrance of foreign matter into the cavity 28.

Another modification contemplated by the switch structure shown and described is the use of an external operator mechanism similar to the external operator mechanism 23 described which will not depend upon the operation of the plungers $\mathbf{60}_p$–$\mathbf{63}_p$, but which will impart movement to either of the sliders within the cavity 28 by engaging the circular boss 85 to move the sliders with the cavity 28 to accomplish the switching arrangements described. Further it can be seen that the plug-in connection between the parts 21 and 22 provides an arrangement whereby the switching parts carried in part 21 and including the external operating mechanism 23 can be removed for service without disturbing the connections of the leads 34 to the female portions of the plug-in connector assemblies 38 to thus provide a device which will provide a plurality of different switching combinations which can be readily serviced.

While certain preferred embodiments of the invention have been specifically disclosed, it is understood that the invention is not limited therto, as many variations will be readily apparent to those skilled in the art and the invention is to be given the broadest possible interpretation within the terms of the following claims.

What is claimed is:

1. An electric limit switch comprising; a rectangular *switch* housing having opposite sidewalls divided along a diagonal line to provide a pair of mating parts which [are arranged to] define a closed internal cavity when the parts are secured together in mating relation, a first of said pair of parts having a [bottom] *rear* wall arranged to be secured to a support and [an end] *a bottom* wall having an opening therein providing a passage for electrical conductors extending from the exterior of the switch into the cavity, a second of said pair of mating parts having a front wall remote from the [bottom] *rear* wall and [an end] *a top* wall remote from the [end] *bottom* wall of the first part, [means on the end wall of the second part for mounting a movable external operator for the switch in any one of a plurality of positions relative to the switch housing,] *a movable external operator for the limit switch having an operator housing mountable on an external portion of the top wall in jutxaposed relation in any one of a plurality of positions on the top wall, the external portion of the top wall having a plurality of raised bosses extending therefrom, said operator housing having a plurality of recesses therein that are complementary in size and shape to the bosses and located in the operator housing to receive the bosses and prevent rotation between the switch housing and the operator housing when the operator is mounted on the top wall in any one of said plurality of positions, removable fastening means cooperating with the raised bosses for selectively securing the operator on the top wall in any one of said plurality of positions,* a switch unit mounted on the front wall within the cavity, said switch unit having an actuator operatively connected with the operator so as to be actuated in response to movements of the operator, a terminal block mounted on the bottom wall within the cavity, said terminal block having a fastening means thereon providing a securement for the electrical conductors, and electrical plug-in means carried respectively by the switch unit and the terminal block electrically connecting the switch unit to the electrical conductors secured by the fastening means.

[2. The combination as recited in claim 1 wherein the means for mounting the external operator includes means for indexing the operator in any of said plurality of positions relative to the housing.]

[3. The combination as recited in claim 2 wherein the means for indexing the external operator includes at least one raised portion on the end wall portion of the second part and a recess in the operator which receives the raised portion.]

[4. The combination as recited in claim 3 wherein the raised portion is substantially square shaped.]

[5. The combination as recited in claim 4 wherein a raised portion is located at each of the corners of a square shaped portion formed on the end wall of the second part.]

6. The [combination] *limit switch* as recited in claim [5] *1* wherein the external operator includes a shaft which is rotatable *in the operator housing* about an axis lying in a plane perpendicular to the bottom wall for actuating the switch unit within the cavity.

7. The [combination] *limit switch* as recited in claim 1 wherein the means respectively carried by the switch unit and the terminal block forming the plug-in connection are blade-like members which are separated from the walls of the second and first part forming the cavity by a barrier of insulating material.

8. An electrical limit switch comprising; a hollow housing providing an internal cavity, a separately enclosed snap switch mounted within the cavity having an operator extending toward an end of the housing, a slider having a portion movable within the cavity and arranged when moved to actuate the switch operator, a pair of plungers carried by the end and each independently movable of the slider and arranged when moved to move the slider, and means including a movable external operator, said means being securable in any one of a plurality of angular positions on the end of the housing and arranged to move the plungers individually and selectively in response to the direction of movement of the external operator.

9. An electric limit switch comprising; a hollow housing providing an internal cavity extending from an end of the housing, a pair of seperately enclosed snap acting electric switches mounted in tandem within the cavity and each having an operator extending toward the end of the cavity, a pair of sliders each guided for movement within the cavity and having a portion in engagement with the operator of one of the switches for moving the operator upon movement of the slider, and a means for moving said sliders comprising; a pair of independently movable plungers each movable independently of the sliders and having a portion engageable with a slider and a means for moving the plungers individually in response to the direction of movement of a movable member mounted external to the cavity on the end of the housing.

10. The [combination] *limit switch* as recited in claim 9 wherein the pair of plungers are identical and different sliders have portions engageable by the plungers in combinations for selectively operating said switches simultaneously, alternately sequentially, as well as alternately and simultaneously in response to the direction of movement of the movable member which is mounted external to the switch housing.

11. The [combination] *limit switch* as recited in claim 9 wherein one of the sliders is provided with an adjustable rotatable portion for adjusting the responsive movement of the operator for the switch in engagement with the said one slider to movement of the movable member which is mounted external to the housing.

12. An electric limit switch comprising; a hollow housing providing an internal cavity extending from an end of the housing, a pair of separately enclosed snap acting electric switches mounted in tandem within the cavity and each having an operator extending toward the end of the cavity, a pair of independently movable sliders each guided for movement within the cavity and having a portion in engagement with the operator of one of the switches for moving the switch operator upon movement of the slider, and a means for selectively and individually actuating said sliders comprising; a pair of individually movable plungers each movable independently of the sliders and having a portion engageable with a portion of one of the sliders and a means for moving the plungers individually in response to the direction of movement of a movable member mounted external to the cavity on the end of the housing.

13. An electric limit switch comprising; a hollow housing providing an internal cavity extending from an end of the housing, a pair of separately enclosed snap acting electric switches mounted in tandem within the cavity and each having an operator extending toward the end of the cavity, a pair of independently movable sliders each guided for movement within the cavity and having a portion in engagement with the operator of one of the switches for moving the operator, and a means for individually actuating said sliders [,] comprising; a pair of movable plungers each movable independently of the sliders, one of said plungers having a portion engageable with a portion of one of the sliders and the other of said plungers having a portion engageable with a portion of the other slider and a means for moving the plungers individually in response to the direction of movement of a movable member mounted external to the cavity on the end of the housing.

14. An electric limit switch, comprising a hollow housing providing an internal cavity extending from an end of the housing, an electric switch mounted in the cavity having a movable actuator extending toward the end of the cavity, a slider movable in the cavity having a portion engaging the actuator for moving said actuator upon movement of the slider, said end including a square shaped portion having a plurality of openings therein with each of said openings alignable with a portion of the slider, said openings including an opening centered on said square shaped portion and for quadrate openings equidistantly located from the center of the square shaped portion with each of said openings being arranged to receive a movable operator having a portion engaging the slider for moving said slider upon movement of the operator.

15. An operator for an electric limit switch comprising; a housing mountable in any one of a plurality of angular positions on an end of an enclosure, said housing when mounted on the enclosure having a cavity facing said end and a pair of spaced axially aligned bores extending from opposite walls of said cavity in an axis parallel to said end of the enclosure, a rotatable shaft journalled in said bores having a portion extending in said cavity and an end extending external to the said housing, a pair of identical oppositely facing members rotatable on the shaft portion within the cavity, a torsion spring having opposite ends in engagement with said members constantly urging said members in opposite directions of rotation on said shaft portion, a stop on each member for limiting the rotation of each member in one direction of rotation by said spring, a camming surface on an external surface of each member arranged to engage a camming surface on an end of a movable plunger extending from said end of the enclosure, and cooperating means on each member and shaft for rotating only one of said members upon rotation of the shaft in one direction and rotating only the other of said members upon rotation of the shaft in the opposite direction.

16. An operator for an electric limit switch comprising; a housing mountable in any one of a plurality of angular positions on an end of an enclosure, cooperating bosses and recesses on the housing and enclosure for preventing rotation between the housing and enclosure when the housing is mounted on the end of the enclosure, said housing when mounted on the enclosure having a cavity facing said end and a pair of spaced axially aligned bores extending from opposite walls of said cavity in an axis parallel to said end of the enclosure, a rotatable shaft journalled in said bores having a portion extending in said cavity and an end extending external to said housing, a pair of identical oppositely facing members rotatably mounted on the shaft portion within the cavity, said members having identical faces in engagement with one another, a torsion spring having opposite ends in engagement with said members constantly urging said members in opposite directions of rotation on said shaft portion, a stop on each member for limiting the rotation of each member in one direction of rotation by said spring, a camming surface on an external surface of each member arranged to engage a camming surface [of] *on* an end of a movable plunger extending from said end of the enclosure, cooperating means on each member and shaft for rotating only one of said members upon rotation of the shaft in one direction and rotating only the outer of said members upon rotation of the shaft in the opposite direction and means on an external surface of each member engageable with a surface portion of the cavity for limiting rotation of the members by said shaft.

*17. The limit switch as recited in claim 1 wherein the external portion of the top wall is square shaped and the bosses are located at each of the corners of the square shaped external portion.*

*18. The limit switch as recited in claim 17 wherein the square shaped portion has a plurality of openings therein including an opening centered in the square shaped portion, four quadrately-located openings equidistantly spaced from the center of the square shaped portion and a threaded opening extending in each of the bosses to facilitate and maintain the operative connection between the switch unit and the movable external operator.*

*19. The limit switch as recited in claim 1 wherein said operative connection between the actuator for the switch unit and the external operator is a slider mounted within the internal cavity adjacent the top wall of the second part, the slider having a portion movable within the cavity which is in engagement with the actuator and arranged when moved to actuate the switch actuator, and at least a pair of plungers carried by a pair of the four quadrately-located openings in the top wall, each plunger being independently movable with respect to each other and arranged when moved to move the slider in response to the direction of movement of the external operator.*

*20. The limit switch as recited in claim 19 wherein each of the pair of said quadrately-located openings is in alignment with a respective portion of the slider, the slider has a portion guidably mounted within said centered opening, and each of the pair of plungers is guidably mounted within a selected one of said four quadrately-located openings and each has a portion in engagement with said slider to complete said operative connection of the switch unit and the movable external operator.*

*21. The limit switch as recited in claim 18 wherein an additional switch unit having an actuator is mounted within the internal cavity in tandem with the said switch unit, the actuators of the switch units extend toward said top wall of the second part, and each actuator is operatively connected with the external operator by means of one of a pair of movable sliders each of which is guided for movement within the cavity and each of which has a portion in engagement with a respective one of the actuators, at least a pair of movable plungers is carried by said first wall, each of the plungers being independently movable with respect to each other and arranged when moved to move an associated one of the sliders in response to the direction of movement of the external operator.*

*22. The limit switch as recited in claim 21 wherein each of said quadrately-located openings at one side of the square-shaped portion is aligned with one of the sliders, and the other two quadrately-located openings are aligned with the other of the sliders.*

References Cited

The following references, cited by the Examiner, are of record in the patented file of this patent or the original patent.

UNITED STATES PATENTS

| | | | |
|---|---|---|---|
| 3,059,071 | 10/1962 | Dobes | 200—47 |
| 3,287,516 | 11/1966 | Nielsen | 200—47 |
| 2,428,832 | 10/1947 | Carbonneau | 200—70 |
| 3,158,703 | 11/1964 | Smidt | 200—51 |
| 3,192,350 | 6/1965 | Horberg | 200—47X |

OTHER REFERENCES

Product Engineering, p. 87, Nov. 12, 1962.

ROBERT K. SCHAEFER, Primary Examiner

H. J. HOHAUSER, Assistant Examiner

PO-1050
(5/69)

UNITED STATES PATENT OFFICE
CERTIFICATE OF CORRECTION

Patent No. Re. 27,016 Dated December 29, 1970

Inventor(s) Rudolf H. Kiessling and Carl A. Schaefer

It is certified that error appears in the above-identified patent and that said Letters Patent are hereby corrected as shown below:

Col. 1, line 26, cancel "maintaining" and insert --maintained--. Col. 5, line 43, cancel "62" and insert --63--. Col. 11, line 51, cancel "$60_p$-$63_p$" and insert --60-63--; line 55, cancel "scrfaces" and insert --surfaces--; line 57, cancel "which are received in the recesses 108 without depending" and insert --trate the foregoing wherein "CW" refers to clockwise ro- --.

Signed and sealed this 4th day of May 1971.

(SEAL)
Attest:

EDWARD M.FLETCHER,JR.
Attesting Officer

WILLIAM E. SCHUYLER, JR.
Commissioner of Patents